United States Patent Office 3,621,750
Patented Nov. 23, 1971

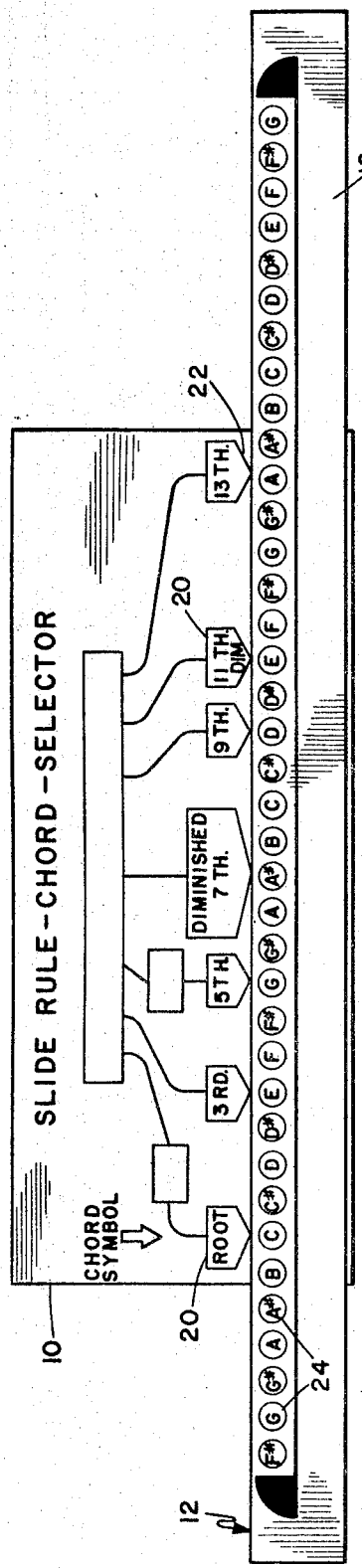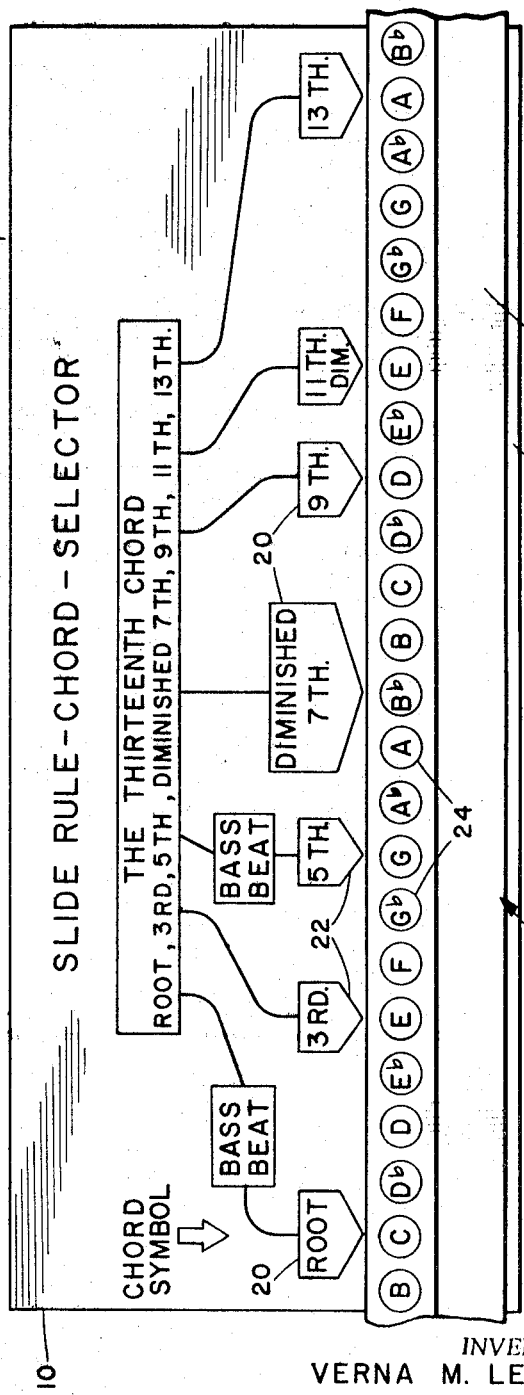

3,621,750
SLIDE RULE CHORD SELECTOR
Verna M. Leonard, 6353 N. Blackstone,
Fresno, Calif. 93721
Filed June 1, 1970, Ser. No. 42,251
Int. Cl. G09b 15/02
U.S. Cl. 84—471        7 Claims

ABSTRACT OF THE DISCLOSURE

A simple mechanical device for instant finding of the names and position of the notes in the chromatic scale used in building the various chords and polychords including the thirteenth chord. This chord finder is constructed from sheet material with a strip body portion and an elongated slide, a return flap on the bottom edge of the strip body portion functioning as a rail upon which the slide is saddled for longitudinal sliding adjustment. The latter carries a chromatic scale of two or more octaves with flatted tones on one side and sharped tones on the other side, both scales being dimensioned and arranged to be read in reference to chord indications on the body portion. The slide is foldable to facilitate handling and storage when not in use.

BACKGROUND OF THE INVENTION

The literature of music contains countless references to the various chords, most of which are recognized as constructed in Thirds from the root tone although modifications are many and varied, one favorite variation appearing in the diminished seventh chord where the seventh interval tone is flatted where chords above the seventh are used in so-called polychords, there is, in effect, an employment of two chords simultaneously but both are still built on thirds above the root tone, as in the ninth, eleventh and thirteenth chords in the next octave. Students sometimes have difficulty recognizing these chords, especially when one or more of the diminished or augmented intervals are used. There is therefore a need for a simple means for instantly indicating the notation of the chords, especially the polychords.

SUMMARY OF THE INVENTION

To meet this need the instant invention provides a mechanical finder for the various chords, which operates like a slide rule but which is flat, being made of sheet material with a slide capable of being folded for compactness. The body portion is formed with a rail-like flap on which the slide traverses and the slide has a chromatic scale thereon of two octaves at least to indicate the actual scale notes used in each of the chords, including the polychords, when the slide is adjusted with the selected key note of the chromatic scale on the slide indexed with the root tone position in a ladder of Thirds on the body portion of the device.

BRIEF DESCRIPTION OF THE DRAWINGS

FIG. 1 is a front elevation of the slide rule chord selector;

FIG. 2 is a fragmentary view of a central portion of the same, on an enlarged scale and with the slide reversed; and FIG. 3 is a vertical sectional view thereof taken on the line 3—3 in FIG. 2.

DETAILED DESCRIPTION OF A PREFERRED EMBODIMENT

There are two principal parts in this invention which can be termed the body portion consisting in an elongated panel 10 of sheet material and a slide 12 which is longer than said body portion panel 10. The panel 10 can be considered as disposed upright and the bottom edge has a returned flap 14 which extends vertically to constitute a rail upon which the slide is mounted. The slide is transversely folded as best illustrated in FIG. 3 to define two depending strips 16 and 18.

Panel 10 is represented as rectangular and the front face thereof has means, which may be printed legends 20, to name and indicate the relative position of the root tone and an ascending ladder of Thirds, or otherwise stated, a ladder of chords and polychords, numerically named and culminating in the thirteenth chord, each with a critical position indicator such as a downwardly pointing arrow configuration 22.

Slide 12 is represented as of sufficient length for three octaves of the chromatic scale with the notations 24 spaced to index properly with the numerical chord name legends 20 and arrow configurations 22. As indicated in FIG. 1 the chromatic scale on one side of the slide is in sharps and on the other side of the slide the scale is in flats.

In using the chord selector, the slide is simply placed on the rail with the desired chromatic scale outermost and positioned with the keynote indexed below the root and the notes of the chords are then instantly indicated by the legends 20 and arrow configurations 22. For example, with the key chosen as C the notes required in the thirteenth chord are those indicated by the legends 20 and arrow configurations 22 in both FIGS. 1 and 2.

In actual practice, the root, Third and Fifth are usually played somewhat separately from the Seventh, Ninth, Eleventh and Thirteenth, often on different instruments. This isolation of the upper and lower components produces a more pleasing harmony or balance of sound. The Third is often unused but the root and Fifth, being often desirable for building a feeling of rhythm, the instant invention points out these two most important tones as "BASS BEAT" tones as indicated by the correspondingly identified boxes in the lines leading to the root and Fifth as shown in FIG. 2. It has been found that even somewhat skilled musicians fail to recognize the importance of the root and Fifth in building a rhythm and the instant invention helps to overcome hesitancy in using this technique both in arranging and in original composition.

I claim:
1. A chord indicator for all keys, comprising:
   an elongated panel constructed of sheet material, said panel having a forward face with means thereon naming and indicating the relative position of the root chord and an ascending ladder of thirds above the root chord culminating in the thirteenth chord, and said panel having a returned flap on one longituinal edge thereof, and
   a slide consisting of an elongated strip of sheet material folded longitudinally, saddled over the free edge of said returned flap, and slidable therealong, said slide having means thereon indicating a melodic progression.

2. Apparatus according to claim 1 wherein the second mentioned means includes means to indicate a chromatic scale of at least two octaves and said slide is foldable on itself when not in use.

3. Apparatus according to claim 1 wherein said slide has means thereon indicating a chromatic scale with the half tones in flats and a second chromatic scale with the half tones in sharps.

4. Apparatus according to claim 1 wherein said last mentioned means indicates a regularly spaced melodic progression of named half-tones in the chromatic scale.

5. Apparatus according to claim 1 wherein said panel has means thereon indicating the tones on the slide, namely the root and Fifth, which are proper for a bass beat and for building chord rhythm.

6. Apparatus according to claim 1 wherein said slide is reversible and the last mentioned means indicates the chromatic scale in flats on one side of the slide and in sharps on the other side.

7. Apparatus according to claim 6 wherein said slide is reversible, end to end, and the last mentioned means indicates a chromatic scale in different forms.

References Cited
UNITED STATES PATENTS

| | | | |
|---|---|---|---|
| 1,741,768 | 12/1929 | Hall | 84—471 |
| 1,804,460 | 5/1931 | Cordier | 84—474 |
| 2,824,479 | 2/1958 | De Rosa | 84—482 |
| 2,938,421 | 5/1960 | Leonard | 84—474 X |
| 3,001,435 | 9/1961 | Duffy et al. | 84—474 |

FOREIGN PATENTS

| | | | |
|---|---|---|---|
| 87,411 | 2/1958 | Netherlands | 84—470 |

RICHARD B. WILKINSON, Primary Examiner

L. R. FRANKLIN, Assistant Examiner

U.S. Cl. X.R.

235—70, 89